S. G. GERLACH.
AUTOMOBILE LOCK.
APPLICATION FILED JAN. 26, 1920.
1,389,499.
Patented Aug. 30, 1921.
2 SHEETS—SHEET 1.
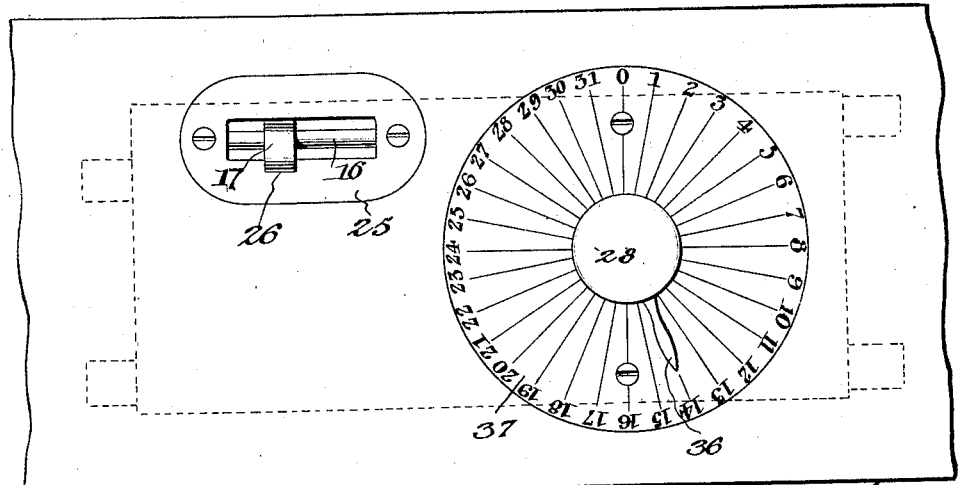
Fig. 1.
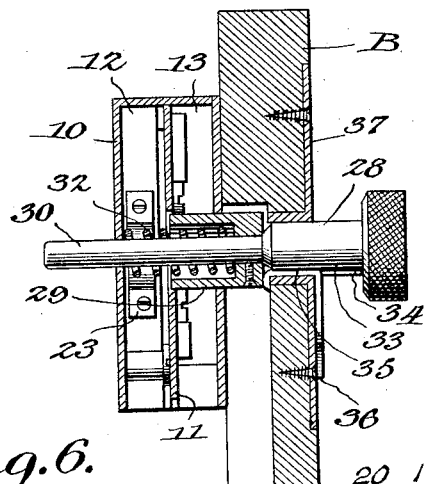
Fig. 4.
Fig. 6.
Fig. 7.
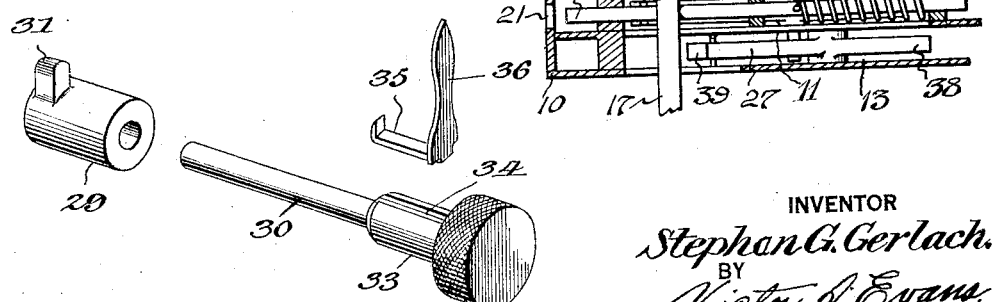
INVENTOR
Stephan G. Gerlach.
BY
Victor J. Evans,
ATTORNEY

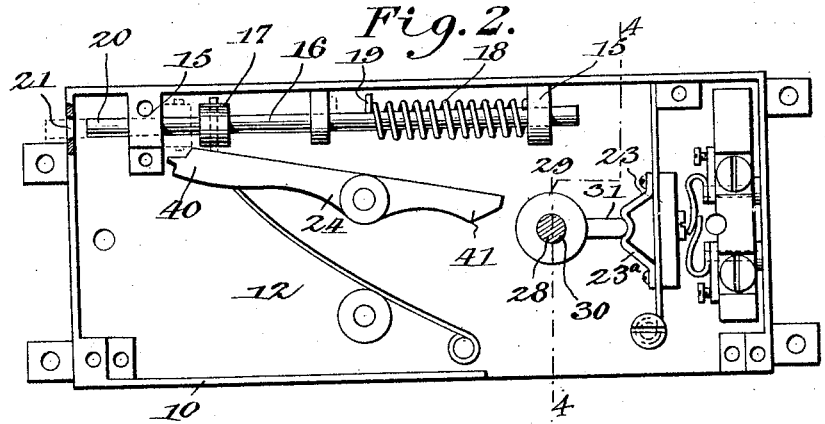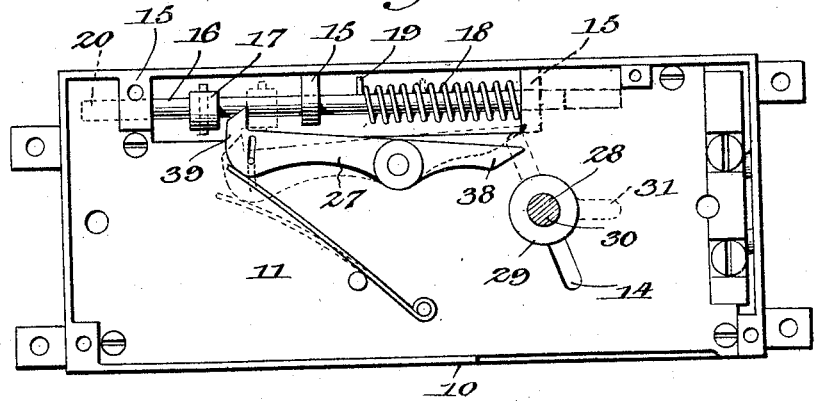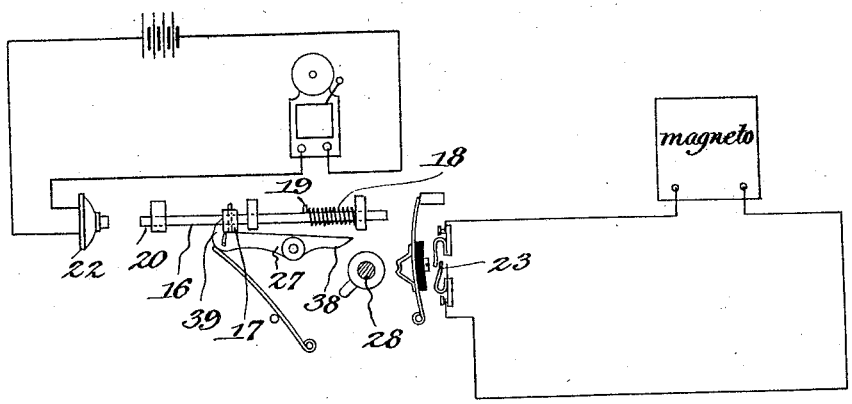

UNITED STATES PATENT OFFICE.

STEPHAN G. GERLACH, OF STRATFORD, CONNECTICUT.

AUTOMOBILE-LOCK.

1,389,499.   Specification of Letters Patent.   Patented Aug. 30, 1921.

Application filed January 26, 1920.   Serial No. 354,310.

*To all whom it may concern:*

Be it known that I, STEPHAN G. GERLACH, a citizen of the United States, residing at Stratford, in the county of Fairfield and State of Connecticut, have invented new and useful Improvements in Automobile-Locks, of which the following is a specification.

This invention relates to locks and as more particularly it relates to anti-theft combination-locks.

Some of the objects of the invention are; to produce a lock which is arranged for use in conjuction with the ignition system of an automobile and with a warning signal so that a person unfamiliar with the working operation or scheme involved will unwittingly cause the warning signal to be sounded in his attempt to wrongly purloin the automobile; to produce a lock which embodies key actuated means—a key being permanently correlated with the lock to prevent tampering and requiring correct knowledge of the manner in which the key should be manipulated to properly condition the ignition system to permit the use or operation of the automobile with the alternative that without such correct knowledge of the proper manner of manipulating the key, a person will be led to unwittingly sound the warning signal.

With these and other objects in view the invention resides in the provision and combination of parts more fully described in the following specification and illustrated in the accompanying drawings in which:—

Figure 1 is an elevation of the parts of the lock which are arranged for access upon the instrument board of the automobile.

Fig. 2 is an interior view of the lock illustrating the relative disposition of some of its parts at the time the automobile is about to be put in motion.

Fig. 3 is a view similar to that shown in Fig. 2, in which the key actuated spring pressed dog is shown and the position it assumes when the actuating bolt forming part of the lock is in a neutral position.

Fig. 4 is a transverse sectional view taken on the line 4—4 of Fig. 2.

Fig. 5 is a diagrammatic view illustrating the plan of operation of the lock.

Fig. 6 is a collective view of the several parts of the manipulating key for the lock.

Fig. 7 is a detail longitudinal sectional view through the bolt forming a part of the device.

Referring now to the drawing, it will be seen, and especially with reference to Fig. 4 of the drawing, that the lock comprises a casing 10 which is subdivided by a guard plate 11 into compartments 12 and 13. The guard plate 11 is provided with a slot 14, the purpose of which will appear. Arranged for movement in guide lugs 15 in the compartment 12 of the casing is an actuating bolt 16 having a laterally extending arm 17. A spring 18 encircles the bolt 16 and is interposed between one of the guide lugs 15 and a pin 19 secured to the bolt. This spring 18 serves normally to project the end 20 of the bolt outwardly through an aperture 21 in the casing 10 to, in the present instance, actuate a push button 22 arranged in an electrical circuit which includes suitable batteries and a signal such as a bell or lamp. A circuit closer 23 is also arranged in the compartment 12 and this circuit closer is in circuit with the magneto, the electrical source for the ignition system of the automobile. A spring pressed detent 24 is also arranged within the compartment 12 and its purpose is to prevent the actuating bolt 16 from being moved from a signaling position without first manipulating the same by the use of the key—the detent being adapted to engage the arm 17 of the bolt 16 when the bolt has moved to a signaling position. The arm 17 is of sufficient length to extend through an opening in the guard plate 11, an opening in one wall of the casing 10 and into openings in the instrument board B and a plate 25 attached to said instrument board. The plate 25 is provided with a notch 26 in which the free end of the arm 17 may be disposed so as to hold the bolt 16 in a neutral position until such time when said bolt may be set to a full retracted position. Arranged within the compartment 13 of the casing is a key actuated spring pressed dog 27 adapted to engage the arm 17 to hold the actuating bolt 16 retracted as set when the car is left parked by the owner. A slot and pin limits the pivotal movement of the dog 27.

The manipulation of the lock is accomplished by the use of a key 28 which comprises a hollow element 29 which is secured to the stem 30 of the key. The element 29 is provided with a bit 31. The key 28 is permanently correlated with the lock. A spring 32 encircles the stem 30 of the key and is interposed between the closed end of the element 29 and a wall of the casing 10.

The shank 33 of the key is provided with a groove 34 and this groove receives the right angularly disposed portion 35 of the pointer 36 so that the pointer will be caused to move with the key. The portion 35 of the pointer is bent over to locate the pointer with relation to the dial 37 and to prevent the displacement thereof. The slot 14 in the guard plate 11 is disposed significantly with respect to one of the numbers on the dial 37—the number fourteen, and this slot 14, of course may be disposed with respect to any particular one of these numbers on the dial to vary the operation of the lock.

In practice, and assuming that the actuating bolt 16 is in its retracted position, held so by the dog 27, any person unfamiliar with the working operation in grasping the manipulating head of the key 28 will cause the bit 31 thereof which by reason of the spring 32 is confined to move within the compartment 13 to engage the end 38 of the dog 27 and move the same causing the disengagement of the portion 39 thereof with the arm 17, the spring 18 will then project the bolt 16 to cause the end 20 thereof to actuate the push button 22 and hence the actuation of the warning signal. When the bolt 16 is projected to signal actuating position, the detent 24 automatically engages arm 17, thus holding said bolt against movement. When the bolt is retracted, the dog 27 automatically engages arm 17 and holds said bolt retracted. On the other hand, a person who is familiar with the working operation of the lock will bring the pointer 36 until it alines with the numeral 14 as shown in Fig. 1 of the drawing which brings the bit 31 into registration with the slot 14 in the guard plate 11 and permits the key 28 as a whole to be moved inwardly, with the bit 31 disposed to move within the compartment 12 and in movement of the key the bit 31 will actuate the circuit closer 23, and the same will remain closed until the key is again moved out of engagement with the part 23ᵃ of the circuit closer. The bolt 16 in its signal actuating position has its arm 17 engaged by the notched end 40 of the detent 24. Thus the bolt 16 is held in a signal actuating position and can not be retracted until the notched end 40 of the detent is moved out of engagement of the arm 17 and this is accomplished by the proper manipulation of the key 28 which causes the bit 31 to engage the end 41 of the detent to move the same on its pivot. It will therefore be understood that unless a person is familiar with the working operation of the lock, the warning signal will be unwittingly rendered active and it will be further impossible for such person to render the signal inactive inasmuch as the detent must first be actuated and this can not be accomplished without first moving the bit 31 of the key through the slot 14 into the compartment 12 in which the detent 41 is disposed as will be understood.

What is claimed as new is:—

1. In a combination-lock, a spring actuated bolt having an arm, a key actuated spring pressed dog which engages said arm for normally holding said bolt retracted, a key which when properly manipulated actuates said dog to release said bolt to an active position, and means for holding said bolt in a neutral position.

2. In a combination-lock, a spring actuated bolt having an arm, a key actuated spring pressed dog which engages said arm for normally holding said bolt retracted, a key actuated detent adapted normally to engage the arm on said bolt to prevent the movement of the bolt to a retracted position, and means for holding said bolt in a neutral position.

3. In a combination-lock, a spring actuated bolt having an arm, a key actuated spring pressed dog which engages said arm for normally holding said bolt retracted, a key actuated detent adapted normally to engage the arm on said bolt to prevent movement thereof to a retracted position, a key having a bit, a pointer arranged to be moved by said key, a dial arranged with relation to said pointer, a guard plate having a slot therein for the passage therethrough of the bit of said key, the slotted guard plate and detent, upon manipulation of the key serving to effect the release of said bolt.

4. In a device as characterized, a spring actuated bolt having an arm, a key actuated spring pressed dog which engages said arm for normally holding said bolt retracted, a key actuated detent adapted normally to engage the arm on said bolt to prevent its movement to a retracted position, and a key actuated yieldingly mounted indented member.

In testimony whereof I have affixed my signature.

STEPHAN G. GERLACH.